US012749004B2

(12) United States Patent
Talanine et al.

(10) Patent No.: US 12,749,004 B2
(45) Date of Patent: Sep. 29, 2026

(54) HYPER-PERSONALIZED QUALIFIED APPLICANT MODELS

(71) Applicant: Microsoft Technology Licensing, LLC, Redmond, WA (US)

(72) Inventors: Kirill Talanine, Sunnyvale, CA (US); Konstantin Salomatin, San Francisco, CA (US); Arjun K. Kulothungun, San Francisco, CA (US); Huseyin Baris Ozmen, San Francisco, CA (US); Linda Fayad, San Francisco, CA (US); Gungor Polatkan, San Jose, CA (US); Deepak Kumar Dileep Kumar, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1464 days.

(21) Appl. No.: 17/167,549

(22) Filed: Feb. 4, 2021

(65) Prior Publication Data

US 2022/0245512 A1 Aug. 4, 2022

(51) Int. Cl.

| | |
|---|---|
| ***G06N 20/00*** | (2019.01) |
| ***G06F 16/9535*** | (2019.01) |
| ***G06Q 10/1053*** | (2023.01) |
| *G06F 7/58* | (2006.01) |

(52) U.S. Cl.

CPC ......... *G06N 20/00* (2019.01); *G06F 16/9535* (2019.01); *G06Q 10/1053* (2013.01); *G06F 7/58* (2013.01)

(58) Field of Classification Search

CPC ....... G06N 20/00; G06F 7/58; G06Q 10/1053
See application file for complete search history.

(56) References Cited

U.S. PATENT DOCUMENTS

| | | | | |
|---|---|---|---|---|
| 11,475,104 | B2 * | 10/2022 | Thomas | G06F 21/31 |
| 11,496,315 | B1 * | 11/2022 | Genner | G06K 19/06037 |
| 2014/0344195 | A1 * | 11/2014 | Drew | G06F 16/35 706/12 |
| 2019/0163780 | A1 * | 5/2019 | Ozcaglar | G06F 16/2423 |
| 2021/0135847 | A1 * | 5/2021 | Manevich | G06F 16/9014 |

(Continued)

OTHER PUBLICATIONS

Zhang et al., "GLMix: Generalized Linear Mixed Models For Large-Scale Response Prediction," Apr. 13, 2016, <https://www.kdd.org/kdd2016/papers/files/adf0562-zhangA.pdf#:~:text=One%20common%20approach%20is%20to%20in-troduce>, pp. 1-10. (Year: 2016).*

(Continued)

*Primary Examiner* — Kyle R Stork
(74) *Attorney, Agent, or Firm* — KDW Firm PLLC

(57) ABSTRACT

In an example embodiment, a fully automated process is provided for frequent model retraining and redeployment of a machine learned model trained to output a prediction of how likely it is that a candidate is qualified for a particular job posting. Model quality verification is provided by maintaining a snapshot of a baseline model and automatically comparing it to a proposed model by performing various metrics on the models by testing the models using a holdout data set that includes only data that was not used during the training process. Overlap between data in the holdout set used during retraining and the training set used during initial training is prevented by splitting each dataset using a hash on certain fields of the data.

20 Claims, 11 Drawing Sheets

(56) References Cited

U.S. PATENT DOCUMENTS

| | | | | |
|---|---|---|---|---|
| 2022/0083899 | A1* | 3/2022 | Bhide | G06N 20/00 |
| 2024/0037153 | A1* | 2/2024 | Cheng | G06Q 10/1053 |

OTHER PUBLICATIONS

Coretti et al. "Seedless Fruit Is the Sweetest: Random No. Generation, Revisited," Aug. 1, 2019, Advances in Cryptography—Crypto 2019, pp. 205-234. (Year: 2019).*

Gebregziabher et al. "Fitting parametric random effects models in very large data sets with application to VHA national data," BMC Medical Research Methodology 2012, pp. 1-14. (Year: 2012).*

Salomatin, Konstantin, "Quality matches via personalized AI for hirer and seeker preferences", https://engineering.linkedin.com/blog/2020/quality-matches-via-personalized-ai, Jul. 30, 2020, 7 Pages.

* cited by examiner

HYPER-PERSONALIZED QUALIFIED APPLICANT MODELS

TECHNICAL FIELD

The present disclosure generally relates to technical problems encountered in machine learning. More specifically, the present disclosure relates to time series anomaly ranking.

BACKGROUND

The rise of the Internet has occasioned two disparate yet related phenomena: the increase in the presence of online networks, with their corresponding user profiles visible to large numbers of people, and the increase in the use of these online networks for job posting services, including job posting services (on the candidate-side) and candidate searches (on the employer-side or recruiter-side). On the employer-side or recruiter-side, it can be beneficial to know whether a potential applicant for a job posting is qualified for the particular job posting. Such information may be useful in targeting applicants for contact or ranking applicants when performing applicant searches, among other uses. This information is also useful on the candidates-side, where it can be used to inform applicants how qualified they are compared to other candidates, ranking potential job postings when performing job posting searches, and notifying candidates of job postings they may be interested in.

Predicting whether an applicant (or potential applicant) is qualified has traditionally been performed using a machine learned model. Specifically, a single "global" model is trained on all user and job posting data patterns. While its large size makes such a model reliable over large candidate pools, there are issues that arise with its use in specific cases. One such case is in the case of rapid adaptation. If a specific job posting-seeker applies to several job postings in quick succession, the recruiters' responses to those applications give a strong signal about the candidate's chances of success for other, similar job postings. But a single global model is too large and slow to train to be able to train it frequently. Additionally, a single global model is too limited in capacity to learn detailed member or job posting-specific patterns. It typically is only able to learn in generalities. For example, it may learn that users of a particular "type" are commonly successful at a particular job posting "type", and thus it may assign a high likelihood that an applicant of that particular type is qualified for a job posting of the particular job posting "type." This, however, fails to take into account cases where for some reason the particular user is significantly more or less qualified for a job posting than their "type" would suggest (such as where the user has skills not reflected in their profile), and also fails to take into account cases where for some reason the particular job posting is somehow different than other job postings of the same "type" (such as where the job posting requires skills not reflected in the job posting description).

Additionally, the labels used for training data for such models are limited based on certain temporal peculiarities with the training data used for models predicting applicant qualification. Specifically, a common factor in determining whether a particular piece of training data is a positive signal for training or a negative signal for training is whether the applicant to which the piece of training data applies was successful in applying for the job posting in question. But the job posting application process can be time consuming, often lasting months between when the applicant first applies for the job posting and when the applicant is actually hired (or, at least, a job offer is extended). Additionally, negative signals are often in the form of the absence of a positive signal (e.g., the recruiter simply not responding to the applicant), which takes time to determine. Waiting months to provide a label for such data results in the data becoming stale, which negatively impacts the reliability of the model.

Furthermore, when prior art models are retrained, the quality of the newly proposed version of the model (called the proposed model) is often compared to the quality of the old version of the model (called the baseline) by computing a series of metrics on each using test data that is randomly selected from a data set. A data leakage problem occurs in that it becomes possible that the data used to test a model may have been used to train the model, thus negating its usefulness for quality testing (as a model will inherently be able to accurately predict the likelihood of an occurrence of something if it was trained on that specific occurrence using the same data). The model would have essentially seen the answers to the test before the test occurs if it has been trained on the same data used in testing.

BRIEF DESCRIPTION OF THE DRAWINGS

Some embodiments of the technology are illustrated, by way of example and not limitation, in the figures of the accompanying drawings.

OVERVIEW DETAILED DESCRIPTION

Figure 1:
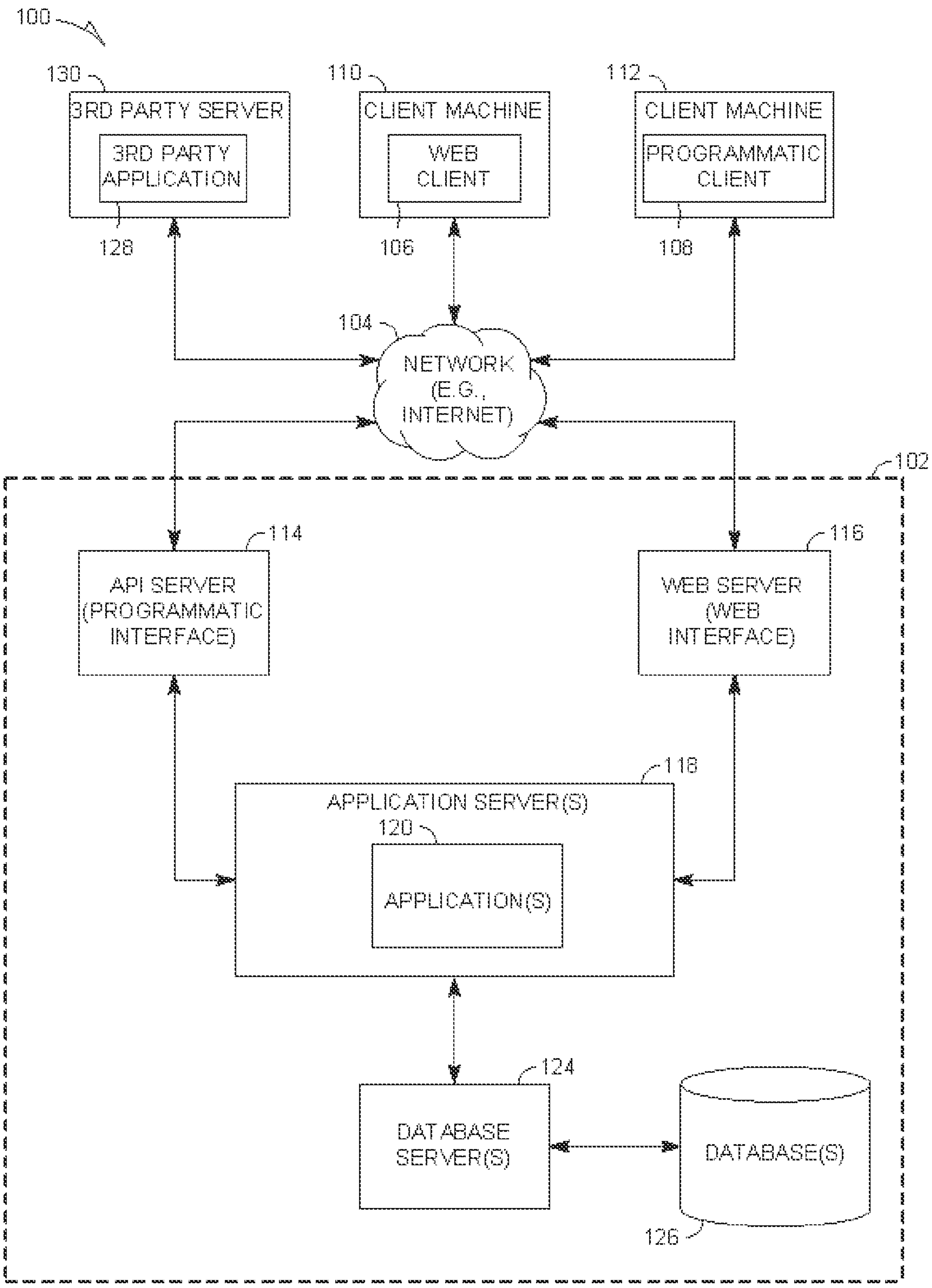
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a fully automated process is provided for frequent model retraining and redeployment of a machine learned model trained to output a prediction of how likely it is that a candidate is qualified for a particular job posting. Model quality verification is provided by maintaining a snapshot of a baseline model and automatically comparing it to a proposed model by testing the models using a holdout data set that includes only data that was not used during the training process. Overlap between data in the holdout set used during retraining and the training set used during initial training is prevented by splitting each dataset using a hash on certain fields of the data.

Additionally, in an example embodiment, the model used for providing predictions of the likelihood that a job posting candidate is qualified for a particular job posting is a generalized mixed effects (GLMix) model. The GLMix model comprises a combination of multiple models, one of which is a global model and the remainder are personalized random effects models. The global model is trained on the entirety of a set of training data, while the various random effects model are trained only on particular slices of the set of training data, depending upon what they are being personalized for. In an example embodiment, one set of random effects models (called the per-user models) are trained on each user and are trained using only training data pertaining to job postings that the particular users applied for, while another set of random effects models (called the per-job posting models) are trained on each job posting and are trained using only training data pertaining to users that applied for the particular job postings. When the GLMix model is used, a particular job posting and user combination can be examined by feeding information about both the particular job posting and the particular user to the global model, feeding information about just the particular job posting (and not the particular user) to a specific per-user model trained just for the particular user, and feeding information about just the particular user (and not the particular job posting) to a specific per-job posting model trained just for the particular job posting, and then combining the results. Additionally, in such a case, the hash used to split each data set is hashed using the variables pertaining to each random effects model type. Thus, in the case where the GLMix model includes a first random effects model type (per-user) and a second random effects model type (per-job posting), the hash will use two variables (user identification and job posting identification). This ensures that the split into which a specific piece of data is put is deterministic and does not vary between iterations of the model training or testing.

Furthermore, in an example embodiment, rather than waiting for an arbitrary length of time to decide that no-reaction (a lack of response to the job posting application) in a training set implies a negative label, a preliminary negative label is applied to certain training data so that it can be used immediately for model training and re-training purposes. More specifically, if an applicant has not yet heard back on a particular job posting application, while other applicants for that job posting have heard back (during a preset time period after the particular application), the application is labeled with a negative label. This preliminary label can be updated if a future recruiter/employer reaction eventually is made.

DESCRIPTION

The disclosed embodiments provide a method, apparatus, and system for providing fully automated retraining and quality assurance of a GLMix model to predict a likelihood of a candidate being qualified for a particular job posting. The result is a class of "hyper-personalized" qualified applicant models capable of leveraging behaviors of specific applicants or job postings to improve predictions for those users and job postings quickly. Furthermore, an optional label inference strategy may also be utilized to further speed up the training and retraining process. A qualified applicant model is a machine learned model that aims to predict how qualified a user is for a particular job posting. More formally, what is being predicted is a recruiter action in response to a member applying for a job posting:!

P(recruiter action|member,job)=?!

Where the recruiter action can depend on the specific application. Examples of recruiter actions include profile views, messages, interview invitations, and job offers.

Such a qualified application model may be used in a number of different verticals. For example, a notification can be sent to recruiters responsible for hiring for a job posting when a qualified applicant applies for that job posting. In another example, job posting search results may be tagged with an annotation when it is determined that the candidate is qualified for the particular job posting(s). In another example embodiment, applicants can be informed how qualified they are compared to other applicants for the same job posting. The computation is based on a qualified applicant score distribution for the job posting. In another example, the qualified applicant score is used as a signal in a job postings ranking model. In another example, candidates may be notified about job postings they are highly qualified for.

All of the above use cases rely on the same fundamental qualified applicant model.

Random effects models are hyper-personalized components that are added to a global model, to produce a GLMix model. In an example embodiment, one random effects model is added for each user (per-used models) and one random effects model is added for each job posting (per-job posting model). The GLMix model can be used to augment a global model trained with linear regression, gradient boosted trees (xgboost), tensor-flow, or neural network machine learned models. A model with random effects may be presented as:

$$\text{logit}(P(\text{recruiter action}|\text{member,job}))=f_{global}(x_m,x_j)+f_m(x_j)+f_j(x_m)$$

Where $x_m$ and $x_j$ are member and job posting feature vectors, $f_{global}$ is a global model (can be the existing baseline), $f_m(x_j)$ is a per-user random effect model trained on the job postings that the member applied to and similarly $f_j(x_m)$ is a per-job posting random-effect trained on members that interacted with this job posting. The random effects models may be, for example, linear models or TensorFlow models, but any model can be used in the above formulation as long as the produced scores can be calibrated to output log-odds. The main point of the random-effect approach is not the use of some specific model, but the leveraging of structure (groupings) in the training data to allow extremely efficient parallelization of training with a huge number of hyper-parameters.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to; a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
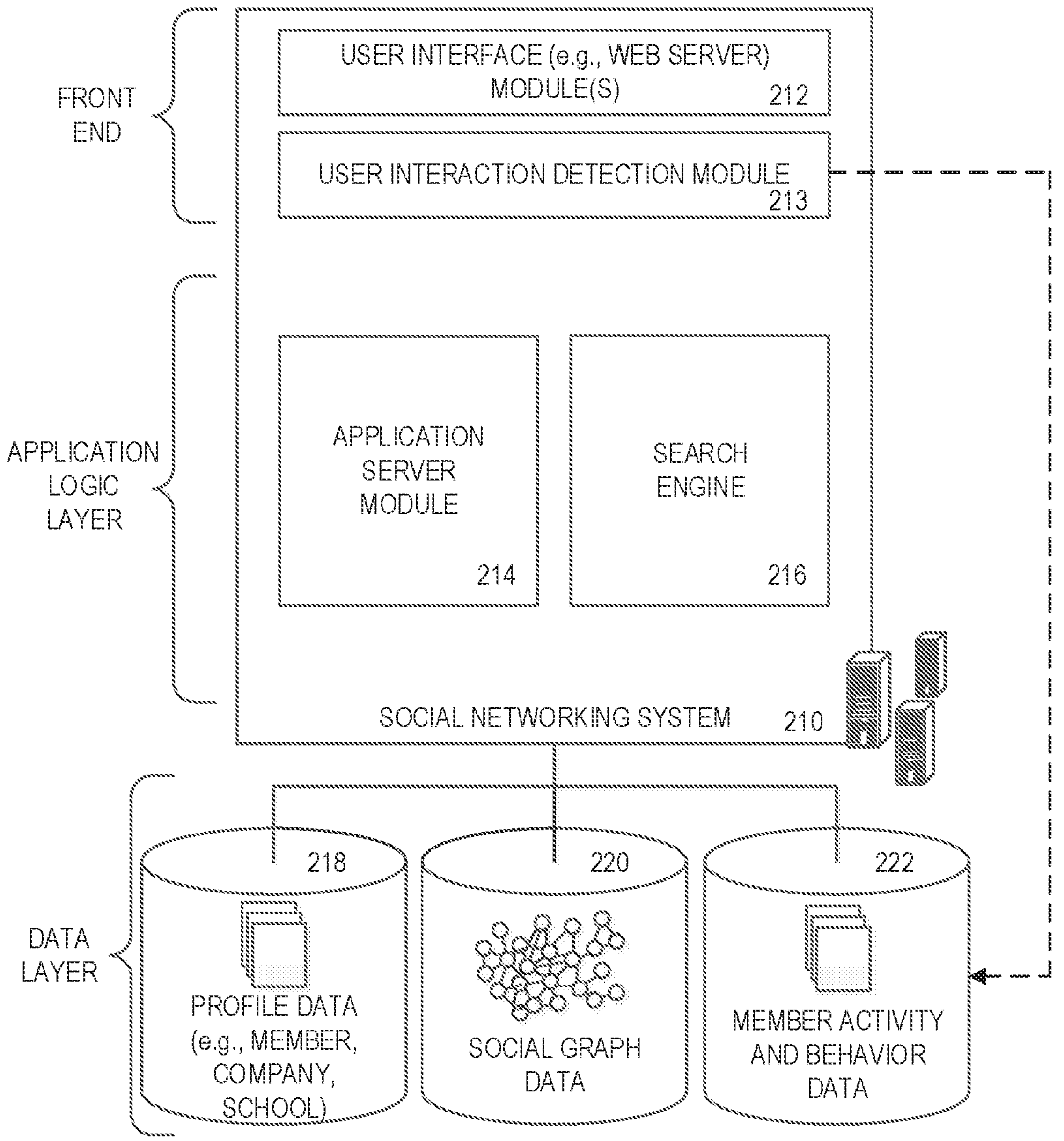
FIG. 2 is a block diagram showing the functional components of an online network, including a data processing module referred to herein as a search engine, for use in generating and providing search results for a search query, consistent with some embodiments of the present disclosure.

In some embodiments, the networked system 102 may comprise functional components of an online network. FIG. 2 is a block diagram showing the functional components of an online network, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the online network.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the online network, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the online network, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job posting titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the online network. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed: Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the online network, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, a social networking system 210 provides an API module via which applications 120 and services can access various data and services provided or maintained by the online network. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the online network, nothing other than data privacy concerns prevents the API from being provided to the public or to certain third parties under special arrangements, thereby making the navigation recommendations available to third-party applications 128 and services.

Although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the online network, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
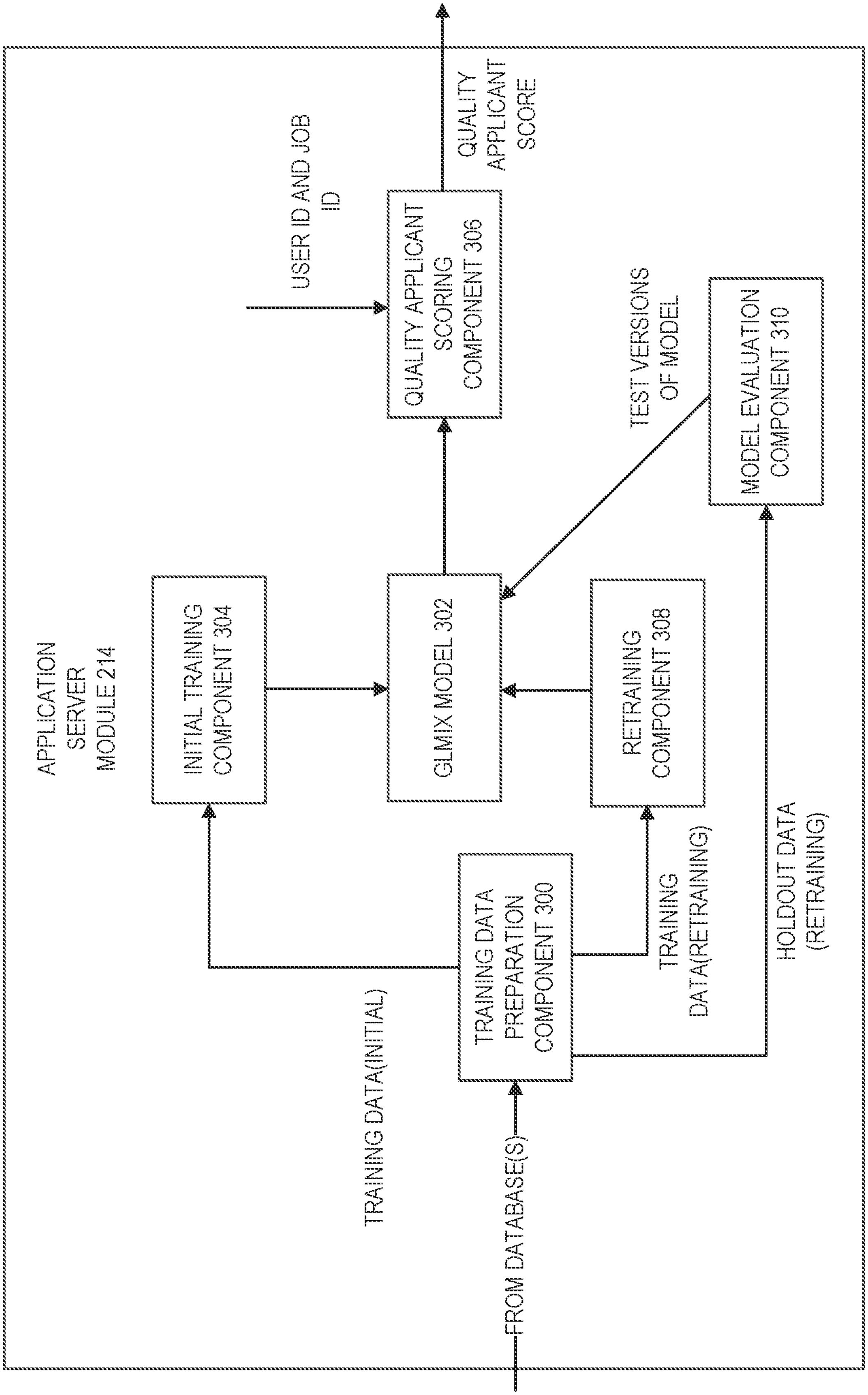
FIG. 3 is a block diagram illustrating application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

A training data preparation component 300 obtains training data from one or more databases and performs one or more transformations on the training data in order to prepare it for use as training data (or, as will be seen, holdout data). These databases may include, for example, profile database 218, social graph database 220, and/or user activity and behavior database 222, among others, such as a job postings database (not pictured). Both initial training (also known as coldstart) and retraining (also known as warmstart) uses a dataset of (ids, label, feature(s)), partitioned into training and holdout sets.

As described briefly earlier, a data leakage problem can occur during subsequent retraining and testing of machine learned models under these circumstances. Specifically, training data may be randomly selected from sample data, while a certain percentage of the sample data is "held out" from being assigned to the training data. Typically, this holdout group is determined by randomly assigning a specific percentage (e.g., 10%) of the available data samples to the holdout group. This holdout group may be used when testing the trained model. In each iteration of the training of the model, a similar splitting of sample data between training sets and holdout sets may be used, but in cases where the sample data has some overlap from iteration to iteration (such as where the sample data comprises all sample data collected within the last 90 days and the retraining occurs 30 days after the initial training, resulting in 60 days of overlapping samples between the training and the retraining iterations), a problem may occur in that some of the samples used to train the data in the initial training can be the same as some of the sample assigned to the holdout set for the retraining. While it may be possible to split the data at each iteration in a way so that no overlap exists between data in the training set for that iteration and holdout set for that same iteration, it is much more complicated to ensure that no overlap exists between the splits performed in multiple iterations.

While the initial holdout set is often used to test the initial training of the model alone, when comparing the initial training of the model to a retraining of the model, the retraining holdout set is used to test both the initial model and the retrained model, as it is necessary for the same data to be used to test both models to produce meaningful comparisons. As such, it is important to ensure that no overlap exists between the training data used in the initial training and the holdout set produced for retraining.

In order to ensure that training data doesn't creep into the holdout data, which will be used as part of the automatic quality assurance aspects involved in automatically switching over from a baseline model to a proposed model, during warmstart retraining, the training data preparation component 300 may generate datasets by partitioning data using a hash of user id and job posting id. This guarantees that some examples are used exclusively for training while others used exclusively to test, while ensuring that any job posting id group (group of training data pertaining to the same job posting) or user id group (group of training data pertaining to the same user) is expected to have both training and test examples. This helps ensure reliability of the model as it ensures that data similar (e.g., for the same user or job posting) to that used to train the model can be used to test the model, testing the model using the exact same data as used to train the model. Specifically, the split at each iteration is performed by using the hash as a seed for a random number generator that selects which samples are assigned to which set (training or holdout).

A hash is a value produced by applying a hash function to a given input. In this example embodiment, that given input is the user id and job posting id, but as described later the hash can be a combination of whatever variables correspond to the random effects model in the GLMix model 302. This hash function is deterministic, meaning that the output for a given input is always the same. Thus, if a particular user id and job posting id combination is fed as input, the output will be the same no matter when or how many times that same combination is fed as input.

Examples of hash functions include identify hash functions, trivial hash functions, folding, mid-squares, division hashing, algebraic coding, unique permutation hashing, multiplicative hashing, Fibonacci hashing, Zobrist hashing, middle and ends, character folding, word length folding, Radix conversion hashing, and rolling hash.

Thus, during warmstart retraining, the training data preparation component 300 generates datasets $D^t_{train}$ and $D^t_{test}$, and updates model $M^{t-1}$ using $D^t_{train}$, producing $M^t$. As will be seen later, $M^{t-1}$ will be compared against $M^t$, evaluating both on $D^t_{test}$. Given that $M^{t-1}$ was originally trained on $D^{t-1}_{train}$, the hashing ensures that examples included in $D^{t-1}_{train}$ do not make their way into $D^t_{test}$.

In other words, the training data preparation component 300 generates a training set for training the GLMix model 302 and a holdout data set for testing the trained GLMix model 302, by splitting sample data using the hash on user id and job posting id. Subsequently, the training data preparation component 300 generates a training set for retraining the GLMix model 302 and a holdout data set for testing the retrained GLMix model 302 against the initially trained GLMix model 302, by splitting sample data using the hash on user id and job posting id. That same holdout data set can then be used for testing further retrainings of the GLMix model 302.

An initial training component 304 may then perform initial training of the GLMix model 302 using the training set designated for initial training, as separated by the training data preparation component 302. This may include feeding the training set into a machine learning algorithm to learn weights for the global model and the random effects models, which in an example embodiment include both per-user models and per-job posting models. The weights are coefficients that are applied (such as multiplied) to various features of data to obtain a quality applicant score for a pair of a user and a job posting. This scoring may be performed by a quality applicant scoring component 306, which may extract feature data about a particular user and a particular job posting and pass this feature data to the GLMix model 302, which then applies the appropriate learned weights to the corresponding values in the feature data to obtain a score that indicates a likelihood that the particular user is qualified for the particular job posting. The quality applicant scoring component 308 may then repeat this process for any number of different combinations of user and job posting, and as mentioned earlier the scores it outputs may be used in a variety of different ways and a variety of different verticals.

It should be noted that this example involves a GLMix model having two types of random effects models: per-user and per-job posting. In examples where the GLMix model uses different or additional random effects models, the hash should correspondingly be based on the combination of all random effect model types in the GLMix model. For example, if the GLMix model has three types of random effects models: per-user, per-job posting, and per-industry, then the hash would correspondingly be based on a user identification, job posting identification, and industry identification. By hashing on a combination of all random effect model types (rather than just one, or otherwise fewer than all), the solution is able to ensure deterministic behavior for specific data samples while still allowing randomness for specific types of data samples. For example, while it is important to ensure that a specific data sample indicating that user A applied for job posting Z at a particular time does not wind up both in the training set for the initial training of the model and the holdout set for the retraining of the model, it is also important that if there are multiple data samples for user A, that not all of them wind up in one set or the other but that they are distributed randomly between the sets. Thus, if the user A applied for 10 different job postings in the sample data, it is important that, at least on average, some percentage of these samples are assigned to the training set and some are assigned to the holdout set, and that distribution still be random. If this is not done, then there exists a real possibility that the model will produce inaccurate results for user A (if, for example, all of user A's sample data were assigned to a holdout set and none to a training set).

It should be noted that the initial training performed by the initial training component 304 may be performed using parallelized block coordinate descent.

Figure 4:
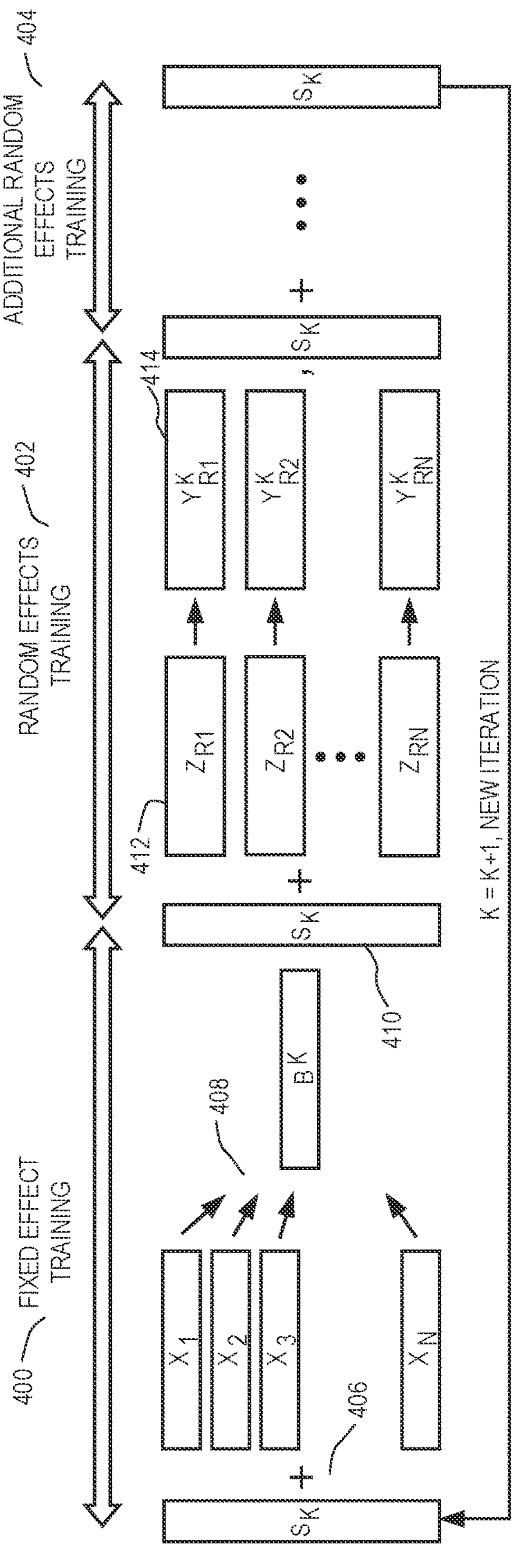
FIG. 4 is a block diagram illustrating the kth iteration of a parallelized block coordinate descent under a bulk synchronous parallel (BSP) paradigm, in accordance with an example embodiment.

FIG. 4 is a block diagram illustrating the kth iteration of a parallelized block coordinate descent under a bulk synchronous parallel (BSP) paradigm, in accordance with an example embodiment. As can be seen, there is the fixed effects training 400, which trains the global model, the random effects training 402, which trains the random effect models, and any additional random effects training 404. The process begins with updating the fixed effect b at iteration k. Here, at 406, the training data is prepared with both the feature set $x_n$ and the latest score $$s_n^k$$

and they are partitioned into M nodes, with each node being a computing devicein a computer cluster, and one of the nodes being designated as a master node. Given the training data, numerous types of distributed algorithms can be applied to learn b. For example, the gradient of b at each sample n can be computed and aggregated from each node to the master node. The gradient may be aggregated in a parallel reduce operation, performed by one or more executor nodes, with the final product being known to the master node. The master node updates b. This is depicted at 408 in FIG. 4. The new coefficients $b^{\{new\}}$ are then broadcast back to each node together with $b^{\{old\}}$ to update the score s as in $$s_n^{new} = s_n^{old} - x_n' b^{old} + x_n' b^{new}$$

in order to prepare for the next effect's update. This is depicted at 410 in FIG. 4. Since the main network communication here is the transmission of b from the master node to the worker nodes, the overall network communication cost for one iteration of updating the fixed effects is O(M P).

In some cases, convergence can be improved by updating b multiple times before updating the random effects, for each iteration.

The main technical challenge in designing a scalable architecture for GLMix on data sets with a large number of random effects is that the dimension of the random effect coefficient space can potentially be as large as $N_rP_r$. Therefore, if the same approach as the one used in updating fixed effects is used, the network communication cost for updating the random effects for r becomes $MN_rP_r$. Given some data of moderate size, for example, if $N_r=10^6$, $P_r=10^5$ and a cluster with M=100, the network input/output cost amounts to $10^{13}$. As a result, one key to making the process scalable is to avoid communicating or broadcasting the random effect coefficient across the computing nodes in the cluster. This is because communicating or broadcasting this coefficient uses network bandwidth that can quickly become bottlenecked when scaled up.

Before the random effect updating phase and as a preprocessing step, for each random effect r and ID l, the feature vectors $z_{rn}$ are combined to form a feature matrix $Z_{rl}$, which comprises all of the $z_{rn}$ that satisfy i(r,n)=l. At iteration k and for random effect r, the current values of s={snk}n∈Ω may be shuffled using the same strategy, i.e., or ID l, $$s_n^k$$

may be grouped to form a vector $$s_l^k,$$

which comprises all of the $$s_n^k$$

that satisfy i(r,n)=l. With the right partitioning strategies, $$s_l^k$$

can be made to collocate with the corresponding feature matrix $Z_{rl}$, to prepare the training data for updating the random effects r using $$\gamma_{rl} = \arg\max_{\gamma_{rl}}\left\{\log p(\gamma_{rl}) + \sum_{n|i(r,n)=l} \log p\left(y_n \middle| s_n - z'_{rn}\gamma_{rl}^{old} + z'_{rn}\gamma_{rl}\right)\right\}.$$

This is depicted at 412 in FIG. 4.

With the training data ready for each ID l, an optimizer can be applied again to solve the optimization problem locally, such that the random effects $\gamma_{rl}$ can be learned in parallel without any additional network communication cost.

It should be noted that, because both the coefficients and data collocate in the same node, the scores can be updated locally within the same step, as depicted at 414 in FIG. 4. It should also be noted that, during the whole process, the random effect coefficients $\gamma_{rl}$ live with the data and would never get communicated through the network; only $s_i$ would get shuffled around the nodes. As a result, the overall network communication cost for one iteration of updating one random effect is O(|Ω|) and O(|R||Ω|) for |R| random effects.

Since the optimization problem can be solved locally, it is possible to further reduce the memory complexity C. Although the overall feature space size is $P_r$ for random effect r, sometimes the underlying dimension of the feature matrix $Z_{rl}$ could be smaller than $P_r$, due to the lack of support for certain features. For example, a user who is a software engineer is unlikely to be served job postings with the required skill "medicine". Hence there will not be any data for the feature/job posting skill=medicine for this user's random effects, and in such a scenario, $Z_{rl}$ would end up with an empty column. As a result, for each random effect r and ID l, $Z_{rl}$ can be condensed by removing all the empty columns and reindexing the features to form a more compact feature matrix, which would also reduce the size of random effect coefficients $\gamma_{rl}$ and potentially improve the overall efficiency of solving the local optimization problem.

The result is that the fixed effects training 400 trains the global model and produces some residuals. These residuals are then used in the random effects training 402 to train the random effects model, which also produces some residuals. These residuals are then used in an additional effects training 404. This process iterates, passing the residuals from the additional effects training 404 back to the fixed effects training 400. These iterations continue until convergence occurs.

The residuals at each stage are the errors produced by whatever model is used by each stage. This allows any type of model to be used at any stage. Thus, the fixed effects model can be a completely different type of model than the random effects model. The residuals are the difference between the values produced by the model and a target.

At some point it becomes time to retrain the GLMix model 302. As such, a retraining component 308 may utilize the training set designated for retraining by the training data preparation component 300 to retrain the GLMix model 302. This may be performed in the same way as the initial training, just using different training data.

A model evaluation component 310 may then test both the previous version of the GLMix model 302 (in the first iteration this would be the version produced by the initial training) and the new version of the GLMix model 306, using the holdout data designated for testing the corresponding version by the training data preparation component 300. Thus, in the first iteration, the holdout data designated for testing the initially trained version is used to test the initially trained version and the holdout data designated for testing the retrained version is used to test the retrained version. In subsequent iterations, the same holdout data (that was designated for testing a retrained version) can be used for both sides of the comparison. This testing may include calculating a series of metrics for performance of the corresponding versions of the GLMix model using the corresponding test data in the corresponding holdout sets. These metrics include Area under the Curve (AUC) and Normalized Discounted Cumulative Gain (NDCG).

AUC is a measure of a two-dimensional area under a receiver operating characteristic (ROC) curve. An ROC curve is a graph showing the performance of a classification model at all classification thresholds of the multiple classification thresholds tried by the classification model. The curve plots two parameters: true positive rate and false positive rate. True positive rate is a ratio of true positives to a sum of true positives and false negatives. False positive rate is a ratio of false positives to a sum of false positives to true negatives. An ROC curve plots true positive rate versus false positive rate at different classification thresholds. Lowering the classification threshold classifies more items as positive, thus increasing both false positives and true positives. AUC provides an aggregate measure of performance across all possible classification thresholds. It is essentially a probability that the model ranks a random positive example more highly than a random negative example.

NDCG is a measure of ranking quality. Every output of a ranking model has a relevance score associated with it. Cumulative gain is the sum of all relevance scores in a recommendation set. Cumulative gain itself, however, fails to use the position of value along with relevance score. Discounted cumulative gain solves this problem by discounting the relevance score by dividing it by the log of its corresponding position. However, discounted cumulative gain is still not complete in that it fails to account for the fact that the number of recommendations can vary from user to user. NDCG utilizes an upper and lower bound so that it can take a mean across all recommendation scores to report a final score. NDCG is the ratio of the discounted cumulative gain for the recommended order and the discounted cumulative gain for an ideal order. The ideal order is the ordering provided by ranking the relevance scores themselves.

Figure 5:
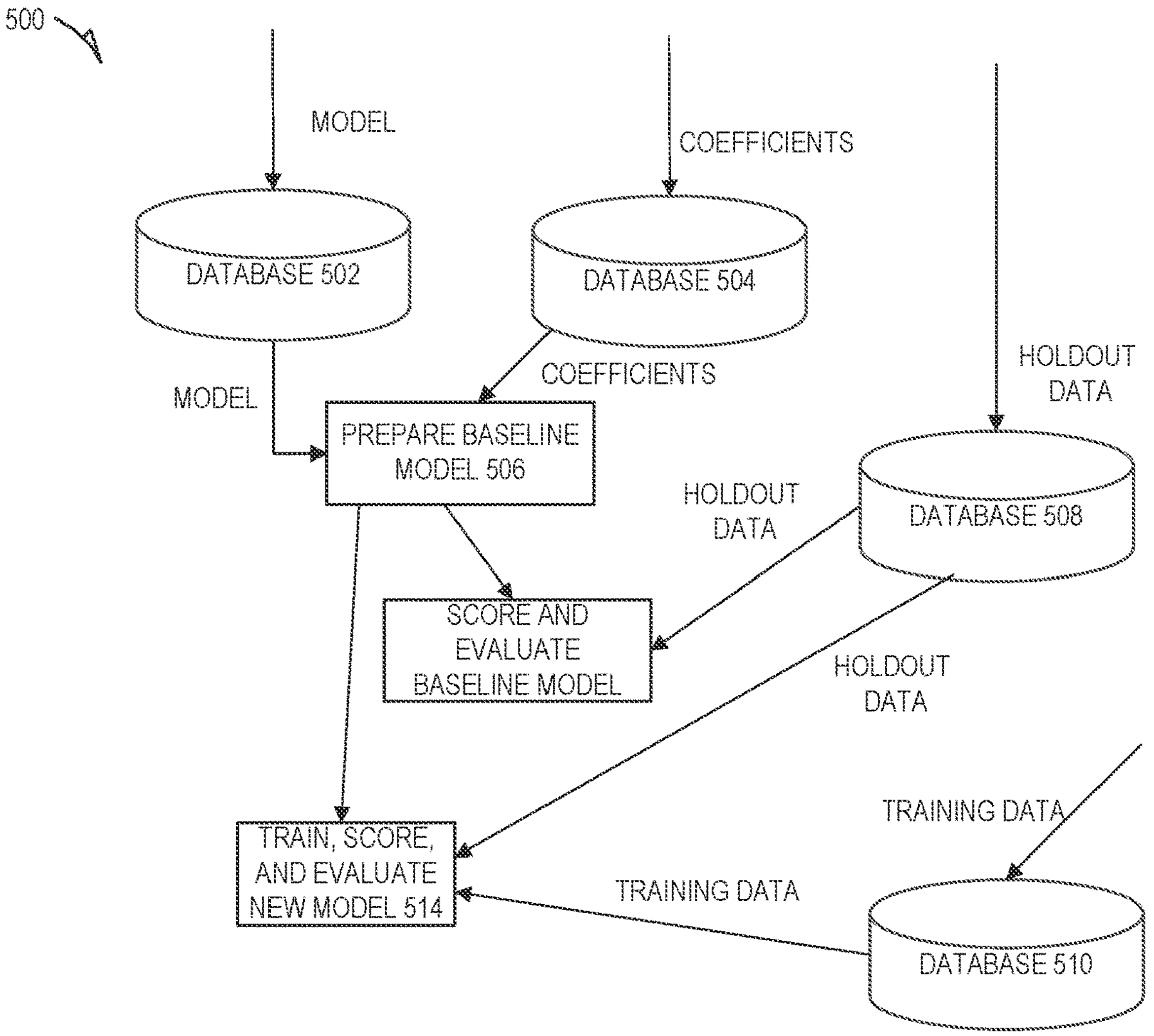
FIG. 5 is a diagram illustrating the functioning of an automated retaining and evaluation process in accordance with an example embodiment.

FIG. 5 is a diagram illustrating the functioning of an automated retraining and evaluation process 500 in accordance with an example embodiment. The baseline model itself, including the global model and all the learned weights, is stored in database 502, while the retrainable weights, specifically the random-effect coefficients produced by the initial coldstart training, are stored in database 504. A recent history of coefficients produced by each retraining can also be kept, with each successful retraining resulting in a new set of coefficients being added to the history. Saving the coefficients allows older models to be retrieved and used in troubleshooting situations. At 506, the baseline model is prepared by bundling together the global model file from database 502 with the random-effect weights from database 504. This bundle is the baseline model that can be used for scoring the new holdout data and as a starting point for retraining.

Holdout data may be stored in database 508 and training data may be stored in database 510. When the holdout data is available, at 512, the baseline model is scored and evaluated. When the training data and the holdout data is available, at 514 the new model is trained, scored, and evaluated. Then, at 516, the baseline model is compared to the new model. If the new model has better metrics than the baseline, then the new model coefficients are then written to database 504.

In an example embodiment, offline work such as retraining may be broken apart into multiple workflows and pipelined. Online retraining of GLMix can take a significant amount of time T (up to 24 hours). If one waits for all steps to complete before beginning the next round of retraining, any new data that accumulates after the steps begin must wait at least T time before starting to process it. The scheduling of flows can also be fragile—if one flow takes longer than expected, the next one may not work. In order to defend against this, there would need to be delays built in between workflows to ensure each has enough time to finish. This make the whole process take longer. Another issue is that a full restart of a single T time period (if there is a failure) extracts a steep cost on model freshness. It would be better to allow a partial restart.

To avoid these issues, in an example embodiment multiple flows are set up and run in a pipelined fashioned. The workflows are run concurrently on different generations of data. Every flow reads input from and writes output to a history directory, which stores the several generations of data. Additionally, every flow begins with wait job postings, which wait for fresh-enough data to become available in the input history directory before proceeding with the flow's main functioning.

An additional benefit of the pipelining design is that a history of the most important data is stored, particularly the labels, the (joined) training and test sets, and the random effects coefficients. This is helpful for debugging and also increases robustness in the case of data corruption. For example, if a past issue resulted in random file corruption, some coefficient data may have been corrupted, but since all recent versions are saved, only some are likely to have been affected. Retraining can be restarted on an uncorrupted version with little operational disruption.

Figure 6:
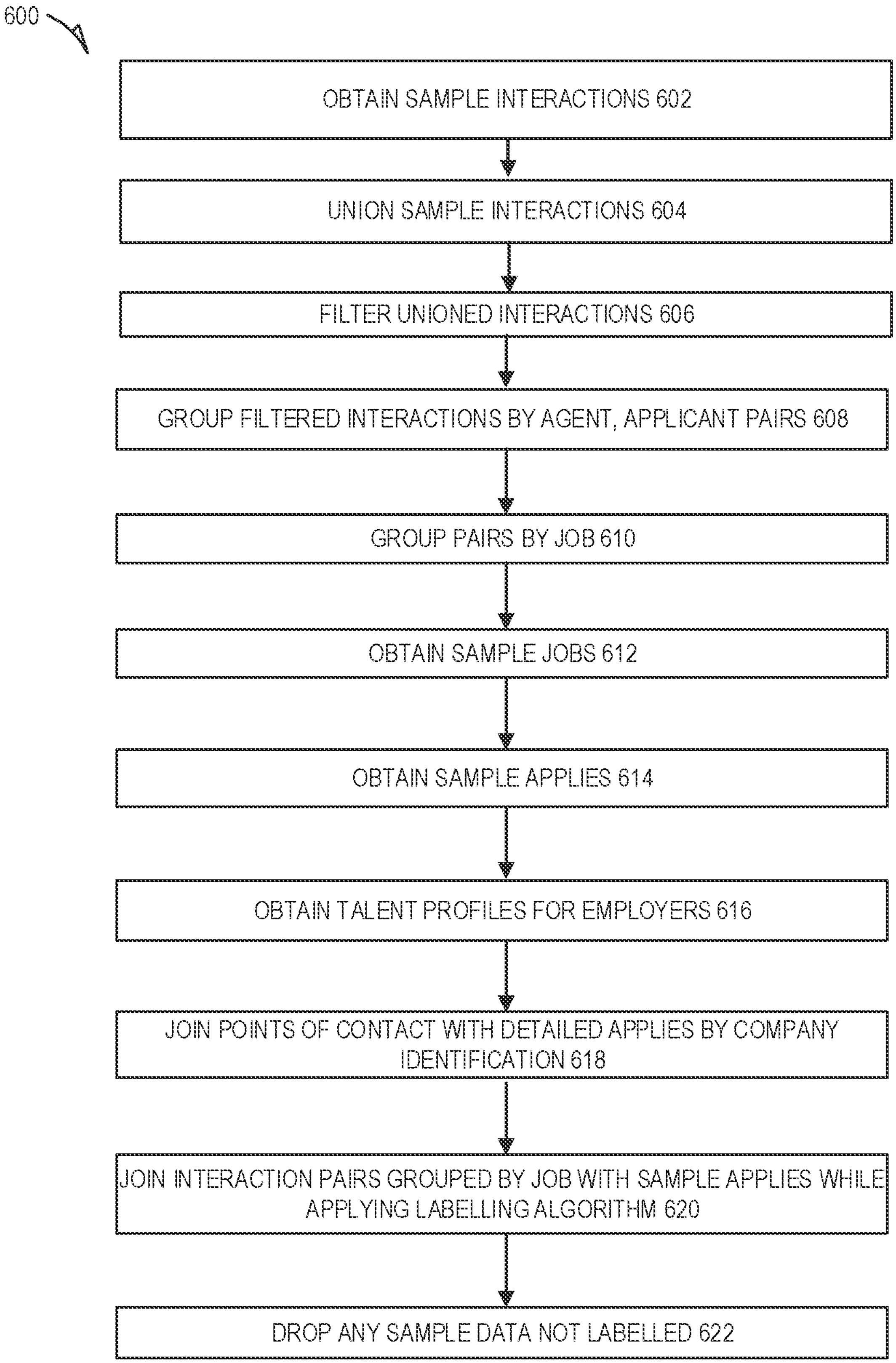
FIG. 6 is flow diagram illustrating a method for preparing training data in accordance with an example embodiment.

FIG. 6 is flow diagram illustrating a method 600 for preparing training data in accordance with an example embodiment. At operation 602, sample interactions are obtained. These are interactions that occurred in sample data, between recruiters/employees and potential applicants in a graphical user interface tool. Sample data is distinguished from other data in that it is data that is being considered to be used for training and/or testing of the model, as opposed to, for example, data on which the model will be applied at evaluation time. For example, the graphical user interface tool may provide a recruiter tool to recruiters/employers to search for and communicate with potential applicants, and may also provide to potential applications a similar tool to search for job postings and communicate with recruiters/employers. Interactions include actions taken by either applicants or recruiters/employers in these tools, such as messaging for information about job postings or about interest in applying, or profile/job posting viewing, saving, favoriting, etc. At operation 604, the sample interactions are unioned, meaning that a union operation is performed on the sample interactions. For purposes of this discussion, recruiters and employers will collectively be referred to as agents.

At operation 606, the unioned interactions are filtered so that only those involving an applicant (i.e., a user who actually applies for a job posting through the graphical user interface tool) remain. At operation 608, the filtered interactions are grouped by agent, applicant pairs. Then at operation 610 these pairs are grouped by job posting.

Additionally, at operation 612, sample job postings are obtained and at operation 614, sample applies for job postings are obtained. At operation 614, the sample job postings are joined with the sample applies (joined by job posting identification, to produce detailed applies). At operation 616, talent profiles for employers are obtained. The talent profiles list, for each employer, one or more points of contact for recruiting communications. At operation 618, the points of contact are joined with the detailed applies by company identification, to produce a set of sample applies with all points of contacts. At operation 620, the interaction pairs grouped by job posting are joined with the sample applies with all points of contact, while at the same time an apply labelling algorithm is applied to the data. Thus, for samples where the applicant was hired or some other definite positive signal is contained in the interaction data, a positive label may be attached to the corresponding piece of sample data. In samples where no definite positive signal is contained in the interaction data, the apply labelling algorithm may or may not attach a tentative negative label to the corresponding piece of sample data, based on the algorithm. This algorithm is described later in detail with respect to FIG. 9. At operation 622, any sample data (applies) not labeled (either tentatively or not tentatively, and either, positively or negatively) are dropped. The result is a set of labeled applies that can be used for "training". Of course, as described earlier, this training data may or may not be actually used to train the GLMix model, as some of it may be segmented off and used as a holdout set.

In an example embodiment, applications are used in the training data if they occurred within a time interval of time T (such as 90 days) up to the point of data processing. Additionally, a post-event window of a fixed length (such as 14 days) may be used. Applications fall into two categories: those whose post-event windows have closed at the time of processing, and those whose window is still open.

Figure 7:
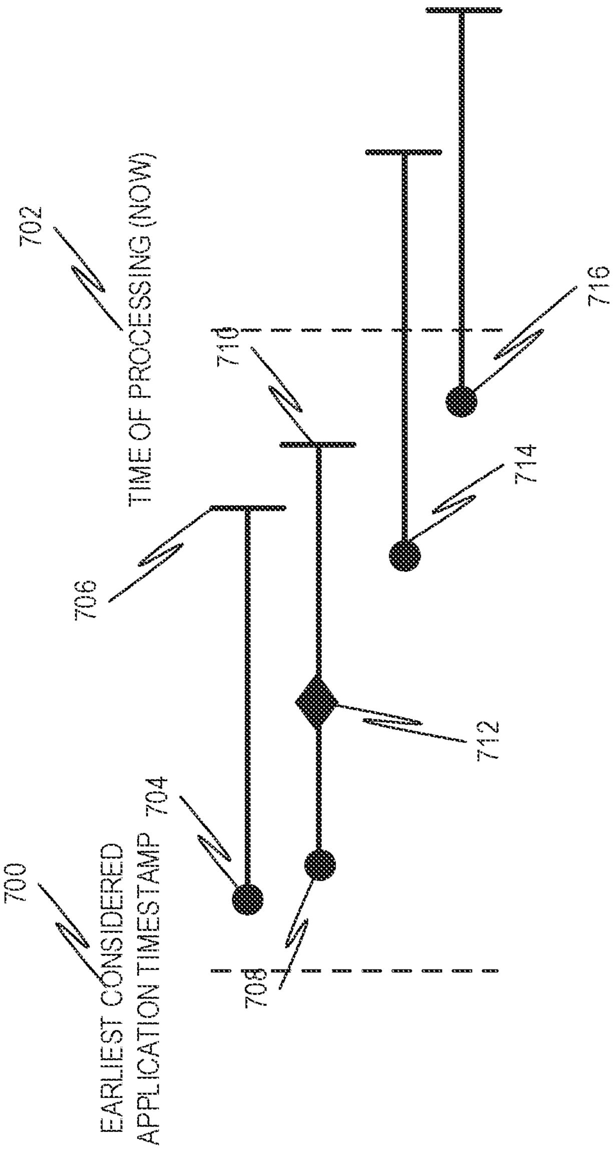
FIG. 7 is a diagram illustrating example time intervals and samples in accordance with an example embodiment.

FIG. 7 is a diagram illustrating example time intervals and samples in accordance with an example embodiment. Here, time 700 is the earliest considered application timestamp (e.g., 90 days ago), while time 702 is the time of processing (e.g., now). Application 704 ended at 706 when its time window (e.g., 14 days) expired without any positive interaction, and thus Application 704 may be marked with a negative label. Application 708 ended at 710, but had a positive interaction at 712 and thus may be marked with a positive label. Application 714 and application 716 both have no interactions prior to time 702, but whose windows have not closed like application 704. As such, application 714 and application 716 may be the subject of the apply labelling algorithm. The algorithm may look at other applications for the same job posting. In this case, application 714 had several other applicants apply for the same job posting and one or more of those other applicants did have a positive interaction in the time window. These other applicants received this positive interaction not during their own post-application window but during the post-application window for the application 714. Thus, at the time the other application received a positive interaction, a positive interaction could also have occurred to application 714 but for some reason did not. This indicates that applications were being looked at by the recruiter/agent/employer at that time, but overlooked application 714, either intentionally or unintentionally. As such, application 714 is assigned a tentative negative label. Application 716 either had no other applicants apply for the same job posting or had no applicants who received positive interactions in the time window, and thus are still considered to be unknown as far as labelling is concerned (and later dropped from the training data as specified earlier).

Figure 8:
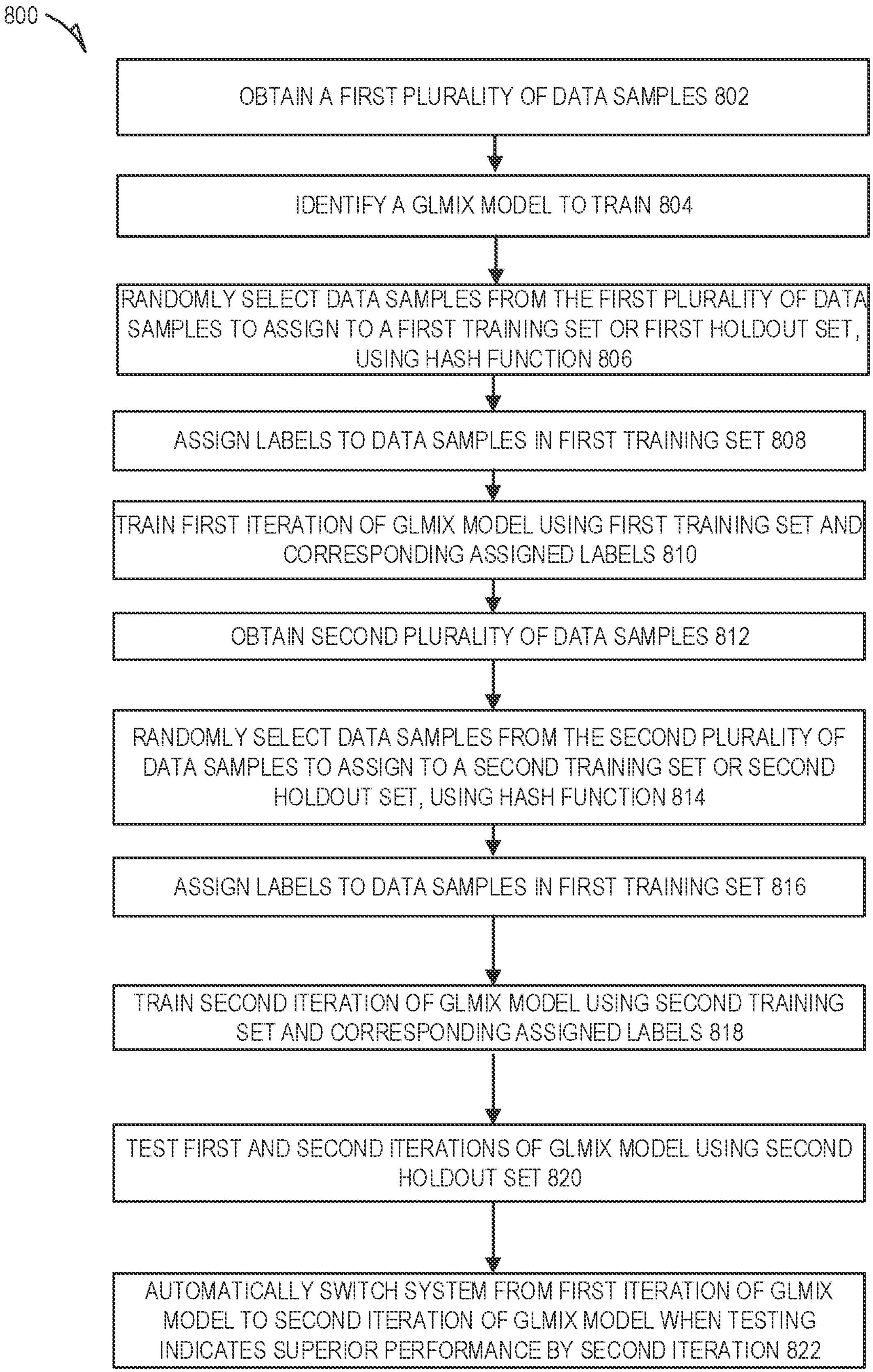
FIG. 8 is a flow diagram illustrating a method for training and retraining a machine learned model in accordance with an example embodiment.

FIG. 8 is a flow diagram illustrating a method for training and retraining a machine learned model in accordance with an example embodiment. At operation 802, a first plurality of data samples is obtained. The data samples indicate a value for a first variable and a value for a second variable. In an example embodiment, the value for the first variable is a user identification and the value for the second variable is a job posting identification. The data samples may also have timestamps.

At operation 804, a generalized linear mixed effect (GLMix) model to train with a first machine learning algorithm may be identified. The GLMix model has a global model and two or more different types of random effects model, each random effects model corresponding to a different variable in the first plurality of data samples. In an example embodiment, the random effect models include a plurality of per-user models, each corresponding to a different user identification, and a plurality of per-job posting models, each corresponding to a different job posting identification.

At operation 806, data samples from the first plurality of data samples are randomly selected to assign to a first training set or a first holdout set using output of a hash function as a seed to a random number generator. The hash function takes as input a value for each variable to which a random effects model in the GLMix model corresponds. In an example embodiment, the hash function takes both user identification and job posting identification as input.

At operation 808, labels are assigned to data samples in the first training set. This process will be described in more detail in FIG. 9 below.

At operation 810, a first iteration of the GLMix model is trained using the first training set, and the labels assigned in operation 808. In an example embodiment, this involves training the global model on all the samples in the first training set, training each per-user model only on samples in the first training set that include a specific user identification corresponding to the particular per-user model, and training each per-job posting model only on samples in the second training set that include a specific job posting identification corresponding to the particular per-job posting model.

At operation 812, a second plurality of data samples is obtained. The data samples in the second plurality of data samples indicate a value for the first variable and a value for the second variable, with at least some of the second plurality of data samples being identical to at least some of the first plurality of data samples. At operation 814, data samples from the second plurality of data samples are randomly selected to assign to a second training set or a second holdout set using output of the hash function as a seed to the random number generator. At operation 816, labels are assigned to data samples in the second plurality of data samples. This assignment may be performed the same way as in operation 808.

At operation 818, a second iteration of the GLMix model is trained using the second training set. This retraining may be performed the same way as in operation 810.

At operation 820, both the first iteration of the GLMix model and the second iteration of the GLMix model are tested using the second holdout set. This may include computing one or more metrics on performance of the respective iterations of the GLMix model on the second holdout set. At operation 822, a system may automatically switch from the first iteration of the GLMix model to the second iteration of the GLMix model if the testing indicates superior performance by the second iteration of the GLMix model. The superior performance may be measured using the computed one or more metrics. Example metrics include, as described above, AUC and NDCG. The entire process may be repeated indefinitely, although in each repeat the second iteration of the model from the last repetition becomes the first iteration of the model in the current repetition.

Figure 9:
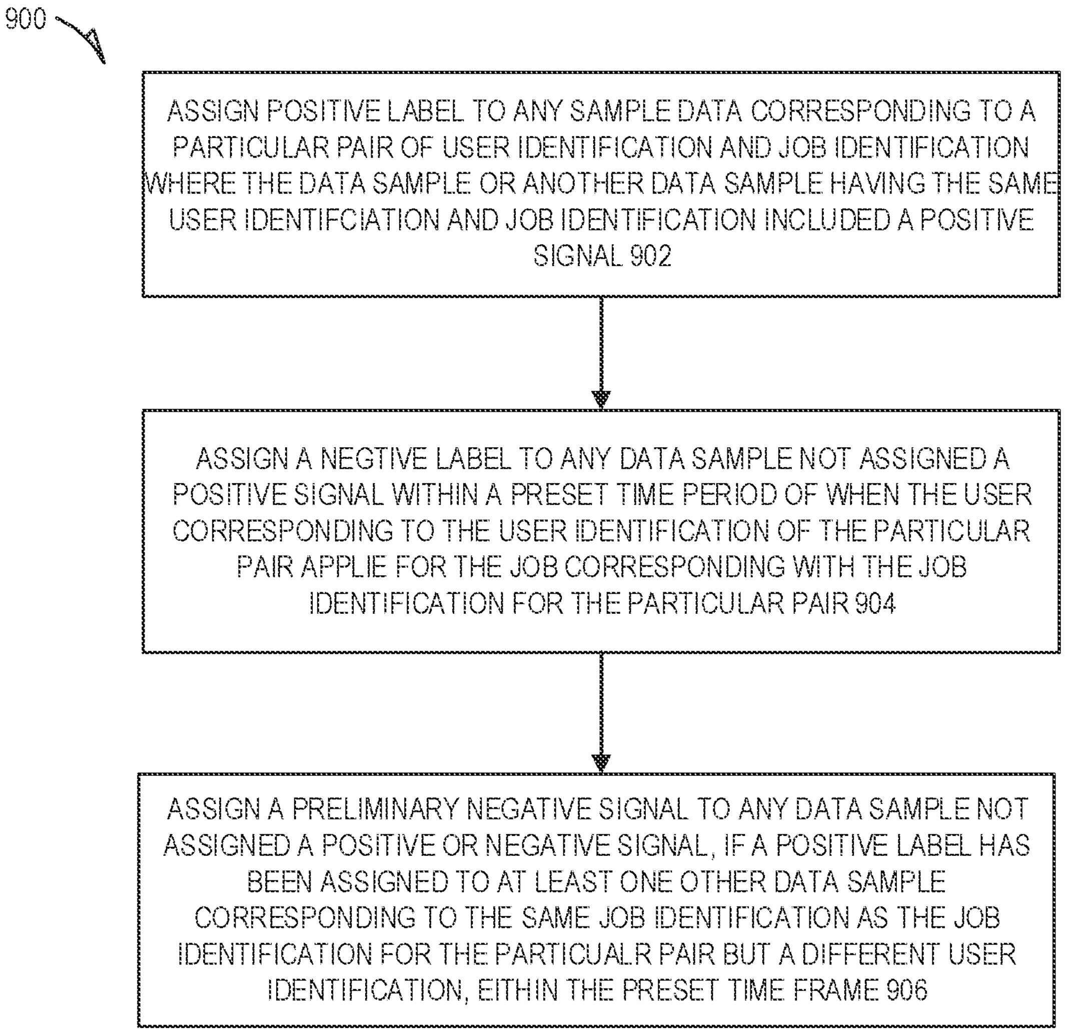
FIG. 9 is a flow diagram illustrating a method for labelling data samples in accordance with an example embodiment.

FIG. 9 is a flow diagram illustrating a method 900 for labelling data samples in accordance with an example embodiment. Each data sample may include a user identification, and job posting identification, and a timestamp, as well as an interaction. The interaction is an interaction that occurred in a graphical user interface, at a time corresponding to the timestamp, between a user having the user identification and an agent for the employer of the job posting corresponding to the job posting identification: These indications may be applications for the job posting or positive or negative responses to the application (e.g., "we would love to interview you," "we are extending you a job offer," "sorry, the position has already been filled," or "sorry, your background does not meet our requirements"). Depending upon the implementation, one or more of the interactions occurring for the same user identification/job posting identification pair after the initial job posting application may be used as positive or negative labels. Additionally, in some cases a preliminary negative label may be assigned.

At operation 902, a positive label is assigned to any data sample corresponding to a particular pair of user identification and job posting identification where the data sample or another data sample having the same user identification and job posting identification included a positive signal.

At operation 904, a negative label is assigned to any data sample not assigned a positive signal within a preset time period of when the user corresponding to the user identification of the particular pair applied for the job posting corresponding with the job posting identification for the particular pair.

At operation 906, a preliminary negative label is assigned to any data sample not assigned a positive signal or negative label, if a positive label has been assigned to at least one other data sample corresponding to the same job posting identification as the job posting identification for the particular pair but a different user identification.

Figure 10:
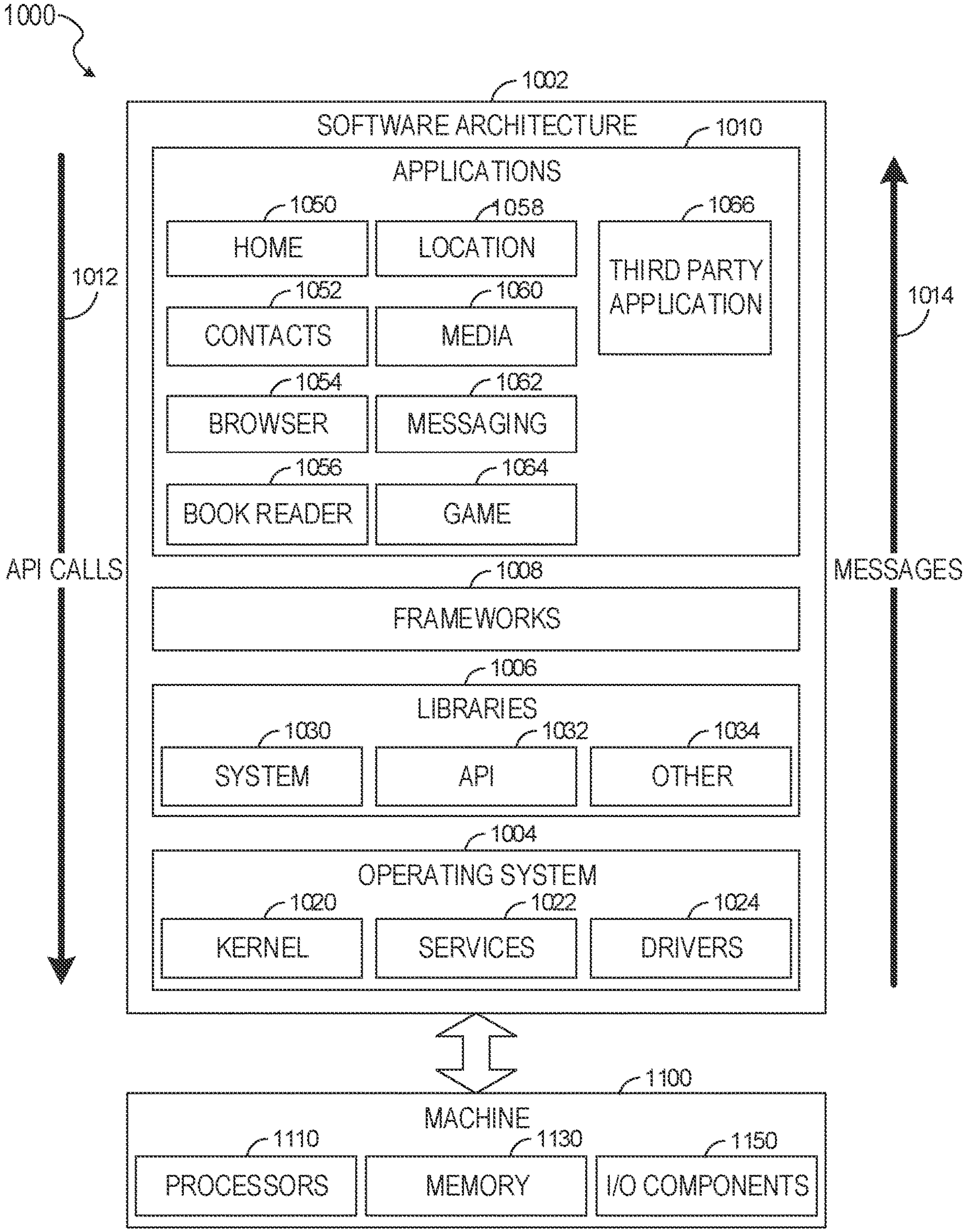
FIG. 10 is a block diagram illustrating a software architecture, in accordance with an example embodiment.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various GUI functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
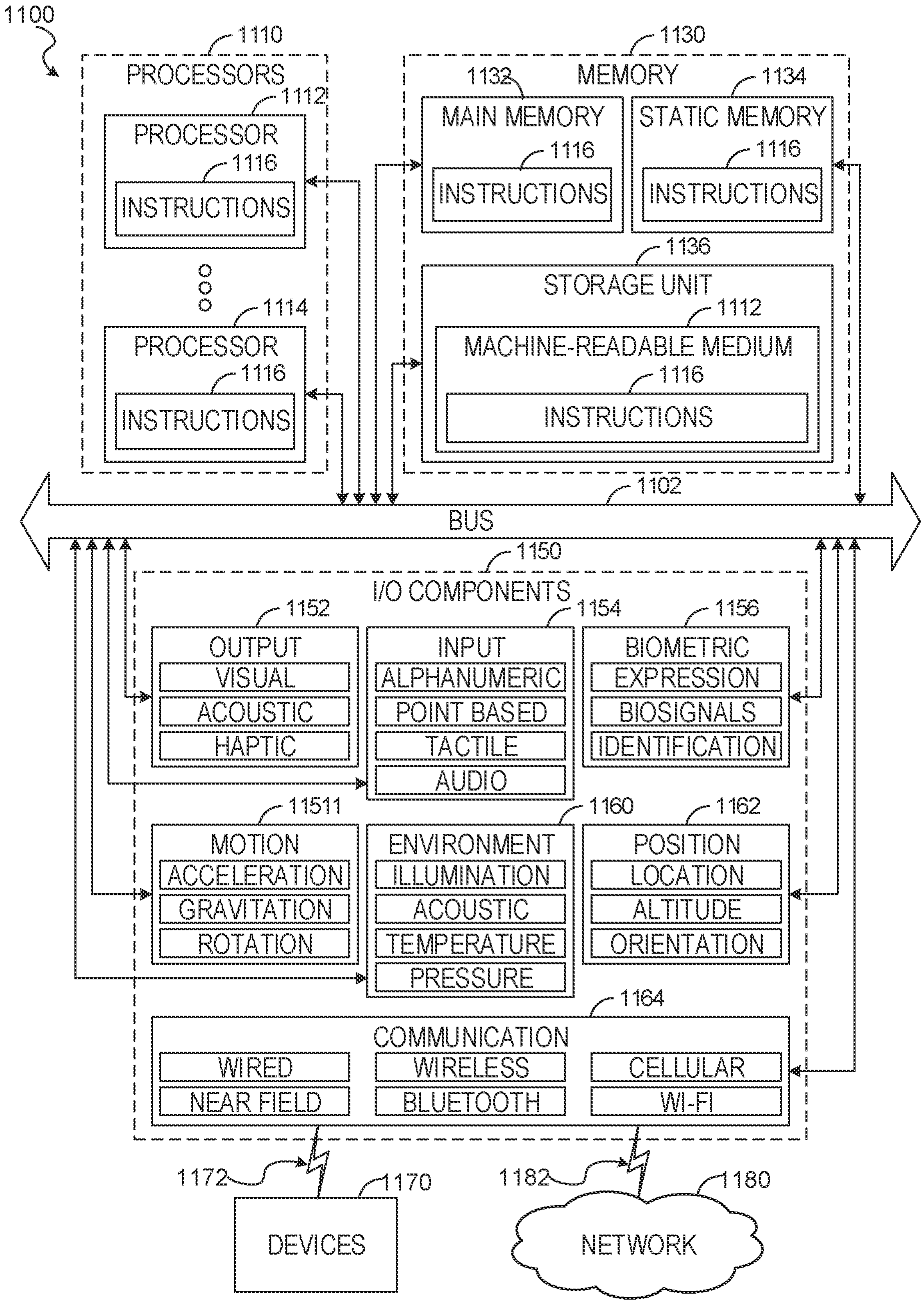
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein may be executed. For example, the instructions 1116 may cause the machine 1100 to execute the method 700 of FIG. 7. Additionally, or alternatively, the instructions 1116 may implement FIGS. 1-11, and so forth. The instructions 1116 transform the general, non-programmed machine 1100 into a particular machine 1100 programmed to carry out the described and illustrated functions in the manner described.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors 1112 (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor), multiple processors 1110 with a single core, multiple processors 1110 with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1116 and/or data. The terms shall accordingly be taken to include, but not be limited to, solid-state memories, and optical and magnetic media, including memory internal or external to the processors 1110. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms: "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

a processing circuit; and a memory having instructions stored thereon, which, when executed by the processing circuit, cause the system to:

obtain a first plurality of data samples, each of the data samples indicating a value for a first variable and a value for a second variable;

identify a generalized linear mixed effect (GLMix) model to train with a first machine learning algorithm, the GLMix model having a global model and a set of different types of random effects models, wherein each type of random effects model corresponds to a different variable in the first plurality of data samples, and wherein a corresponding instance of each type of random effects model is trained using the value for the first variable or the value for the second variable;

generate a set of random numbers using a random number generator, the random number generator using output of a hash function as a seed therefor, wherein the hash function takes as input a value for each variable to which a random effects model in the GLMix model corresponds, wherein the hash function is based on a combination of random effects model types;

assign a corresponding one of the set of random numbers to the data samples from the first plurality of data samples;

randomly select data samples from the first plurality of data samples, based on the corresponding random number assigned thereto, to assign to a first training set or a first holdout set, wherein the global model is trained using data samples in the first training set;

train a first iteration of the GLMix model using the first training set;

obtain a second plurality of data samples, the data samples in the second plurality of data samples indicating a value for the first variable and a value for the second variable, at least some of the second plurality of data samples being identical to at least some of the first plurality of data samples;

randomly select data samples from the second plurality of data samples to assign to a second training set or a second holdout set using output of the hash function as a seed to the random number generator;

train a second iteration of the GLMix model using the second training set;

test both the first iteration of the GLMix model and the second iteration of the GLMix model using the second holdout set.

2. The system of claim 1, wherein the system being caused to randomly select data samples to assign to a first training set or a first holdout set includes the system being caused to randomly assign a set percentage of data samples to the first holdout set.

3. The system of claim 1, wherein training a first iteration of the GLMix model using the first training set includes the system being caused to:

train a random effect model of a first type using only data samples in the first training set that correspond to a particular value for the first variable; and train a random effect model of a second type using only data samples in the first training set that correspond to a particular value for the second variable.

4. The system of claim 3, wherein the first plurality of data samples and the second plurality of data samples include graphical user interface actions by users to apply for job postings, and graphical user interactions to communicate with users who apply for job postings, wherein the first variable is a user identification and the second variable is job posting identification.

5. The system of claim 4, wherein the random effect model of the first type is a per-user model and the random effect model of the second type is a per-job posting model.

6. The system of claim 4, wherein training the first iteration of the GLMix model and training the second iteration of the GLMix model data includes the system being caused to assign a positive label to any data sample corresponding to a particular pair of user identification and job posting identification where the data sample or another data sample included a positive signal from an agent of an employer corresponding to the job posting identification in the particular pair.

7. The system of claim 6, wherein the positive signal is a job offer.

8. The system of claim 6, wherein the positive signal is an interview request.

9. The system of claim 6, wherein the positive signal is a communication sent from the agent of the employer to the user corresponding to the user identification of the particular pair.

10. The system of claim 6, wherein train the first iteration of the GLMix model and train the second iteration of the GLMix model data includes, for a data sample not assigned a positive label within a preset time frame after the user corresponding to the user identification of the particular pair applied for the job posting corresponding with the job posting identification for the particular pair, the system being caused to assign a negative label.

11. The system of claim 10, wherein train the first iteration of the GLMix model and train the second iteration of the GLMix model data includes, for a data sample not assigned a positive label or a negative label, the system being caused to assign a preliminary negative label to the data sample if a positive label has been assigned to at least one other data sample corresponding to the same job posting identification as the job posting identification for the particular pair but a different user identification, within the preset time frame.

12. The system of claim 1, wherein the system is further caused to:

automatically switch from the first iteration of the GLMix model to the second iteration of the GLMix model based on the testing.

13. A computerized method comprising:

obtaining a first plurality of data samples, the data samples indicating a value for a first variable and a value for a second variable;

identifying a generalized linear mixed effect (GLMix) model to train with a first machine learning algorithm, the GLMix model having a global model and a set of different types of random effects models, wherein each type of random effects model corresponds to a different variable in the first plurality of data samples, and wherein a corresponding instance of each type of random effects model is trained using the value for the first variable or the value for the second variable;

generating a set of random numbers using a random number generator, the random number generator using output of a hash function as a seed therefor, wherein the hash function takes as input a value for each variable to which a random effects model in the GLMix model corresponds, wherein the hash function is based on a combination of random effects model types;

assigning a corresponding one of the set of random numbers to the data samples from the first plurality of data samples;

randomly selecting data samples from the first plurality of data samples, based on the corresponding random number assigned thereto, to assign to a first training set or a first holdout set, wherein the global model is trained using data samples in the first training set;

training a first iteration of the GLMix model using the first training set;

obtaining a second plurality of data samples, the data samples in the second plurality of data samples indicating a value for the first variable and a value for the second variable, at least some of the second plurality of data samples being identical to at least some of the first plurality of data samples;

randomly selecting data samples from the second plurality of data samples to assign to a second training set or a second holdout set using output of the hash function as a seed to the random number generator;

training a second iteration of the GLMix model using the second training set;

testing both the first iteration of the GLMix model and the second iteration of the GLMix model using the second holdout set; and automatically switching from the first iteration of the GLMix model to the second iteration of the GLMix model if the testing indicates superior performance by the second iteration of the GLMix model.

14. The method of claim 13, wherein the training a first iteration of the GLMix model using the first training set includes:

training a random effect model of a first type using only data samples in the first training set that correspond to a particular value for the first variable; and training a random effect model of a second type using only data samples in the first training set that correspond to a particular value for the second variable.

15. The method of claim 14, wherein the first plurality of data samples and the second plurality of data samples include graphical user interface actions by users to apply for job postings, and graphical user interactions by agents of employers to communicate with users who apply for job postings, wherein the first variable is a user identification and the second variable is job posting identification.

16. The method of claim 15, wherein the training the first iteration of the GLMix model and the training the second iteration of the GLMix model data includes assigning a positive label to any data sample corresponding to a particular pair of user identification and job posting identification where the data sample or another data sample included a positive signal from an agent of an employer corresponding to the job posting identification in the particular pair.

17. The method of claim 16, wherein the training the first iteration of the GLMix model and the training the second iteration of the GLMix model data includes, for a data sample not assigned a positive label within a preset time frame after the user corresponding to the user identification of the particular pair applied for the job posting corresponding with the job posting identification for the particular pair, assigning a negative label.

18. The method of claim 17, wherein the training the first iteration of the GLMix model and the training the second iteration of the GLMix model data includes, for a data sample not assigned a positive label or a negative label, assigning a preliminary negative label to the data sample if a positive label has been assigned to at least one other data sample corresponding to the same job posting identification as the job posting identification for the particular pair but a different user identification, within the preset time frame.

19. A non-transitory machine-readable storage medium comprising instructions which, when implemented by one or more machines, cause the one or more machines to perform operations comprising:

obtaining a first plurality of data samples, the data samples indicating a value for a first variable and a value for a second variable;

identifying a generalized linear mixed effect (GLMix) model to train with a first machine learning algorithm, the GLMix model having a global model and a set of different types of random effects models, wherein each type of random effects model corresponds to a different variable in the first plurality of data samples, and wherein a corresponding instance of each type of random effects model is trained using the value for the first variable or the value for the second variable;

generating a set of random numbers using a random number generator, the random number generator using output of a hash function as a seed therefor, wherein the hash function takes as input a value for each variable to which a random effects model in the GLMix model corresponds, wherein the hash function is based on a combination of random effects model types;

assigning a corresponding one of the set of random numbers to the data samples from the first plurality of data samples;

randomly selecting data samples from the first plurality of data samples, based on the corresponding random number assigned thereto, to assign to a first training set or a first holdout set, wherein the global model is trained using data samples in the first training set;

training a first iteration of the GLMix model using the first training set;

obtaining a second plurality of data samples, the data samples in the second plurality of data samples indicating a value for the first variable and a value for the second variable, at least some of the second plurality of data samples being identical to at least some of the first plurality of data samples;

randomly selecting data samples from the second plurality of data samples to assign to a second training set or a second holdout set using output of the hash function as a seed to the random number generator;

training a second iteration of the GLMix model using the second training set;

testing both the first iteration of the GLMix model and the second iteration of the GLMix model using the second holdout set; and automatically switching from the first iteration of the GLMix model to the second iteration of the GLMix model if the testing indicates superior performance by the second iteration of the GLMix model.

20. The non-transitory machine-readable storage medium of claim 19, wherein the training a first iteration of the GLMix model using the first training set includes:

training a random effect model of a first type using only data samples in the first training set that correspond to a particular value for the first variable; and training a random effect model of a second type using only data samples in the first training set that correspond to a particular value for the second variable.

* * * * *